(12) United States Patent
Sinha et al.

(10) Patent No.: US 8,862,421 B2
(45) Date of Patent: *Oct. 14, 2014

(54) SYSTEM AND METHOD FOR AUTOMATICALLY CALIBRATING A TEMPERATURE SENSOR

(75) Inventors: Manoj Sinha, Boise, ID (US); Sujeet Ayyapureddi, Boise, ID (US); Brandon Roth, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1046 days.

This patent is subject to a terminal disclaimer.

(21) Appl. No.: 12/897,645

(22) Filed: Oct. 4, 2010

(65) Prior Publication Data

US 2011/0019713 A1    Jan. 27, 2011

Related U.S. Application Data

(63) Continuation of application No. 11/183,684, filed on Jul. 18, 2005, now Pat. No. 7,809,519.

(51) Int. Cl.
*G01K 15/00* (2006.01)
*G01K 7/01* (2006.01)

(52) U.S. Cl.
CPC .............. *G01K 15/00* (2013.01); *G01K 15/005* (2013.01); *G01K 7/015* (2013.01)
USPC ........................................................ 702/99

(58) Field of Classification Search
CPC ... G01K 15/002; G01K 15/00; G01K 15/005; G01J 5/522

USPC .......................................................... 702/99
See application file for complete search history.

(56) References Cited

U.S. PATENT DOCUMENTS

| | | | |
|---|---|---|---|
| 3,857,285 A | 12/1974 | Athey et al. | |
| 3,932,849 A | 1/1976 | Welch | |
| 3,946,200 A * | 3/1976 | Juodikis | 219/499 |
| 4,523,084 A | 6/1985 | Tamura et al. | |
| 5,501,517 A * | 3/1996 | Kiuchi | 361/101 |
| 6,377,110 B1 | 4/2002 | Cooper | |
| 6,678,185 B1 | 1/2004 | Cleary | |
| 7,368,973 B2 * | 5/2008 | Sato | 327/512 |
| 7,427,158 B2 * | 9/2008 | Yoshida | 374/172 |
| 2006/0044047 A1 | 3/2006 | Porter | |

FOREIGN PATENT DOCUMENTS

JP    58219621 A  * 12/1983
JP    08304313      11/1996

* cited by examiner

*Primary Examiner* — Tung S Lau
*Assistant Examiner* — Xiuquin Sun
(74) *Attorney, Agent, or Firm* — Fletcher Yoder PC

(57) ABSTRACT

There is provided a system and method for automatically calibrating a temperature sensor. More specifically, there is provided a system including a temperature sensor that includes a first resistance configured to indicate a temperature of the temperature sensor and a second resistance, in series with the first resistor, wherein the second resistance is adjustable to calibrate the first resistance, and a calibration circuit, coupled to the temperature sensor and configured to automatically calibrate the first resistance.

12 Claims, 6 Drawing Sheets

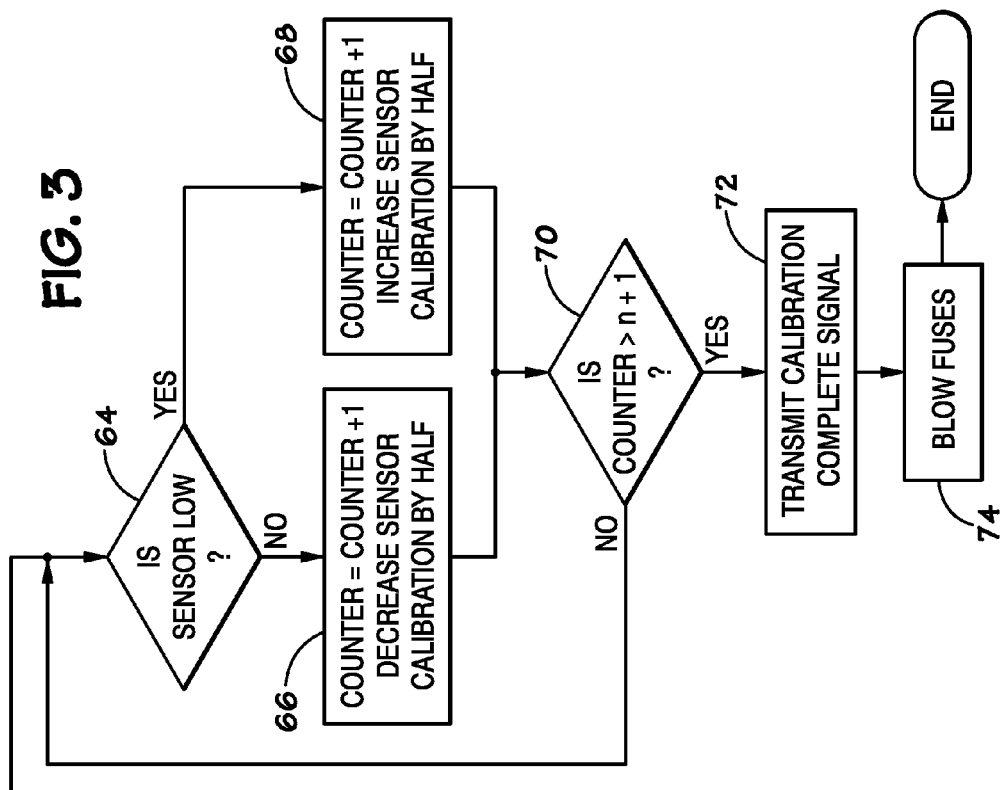
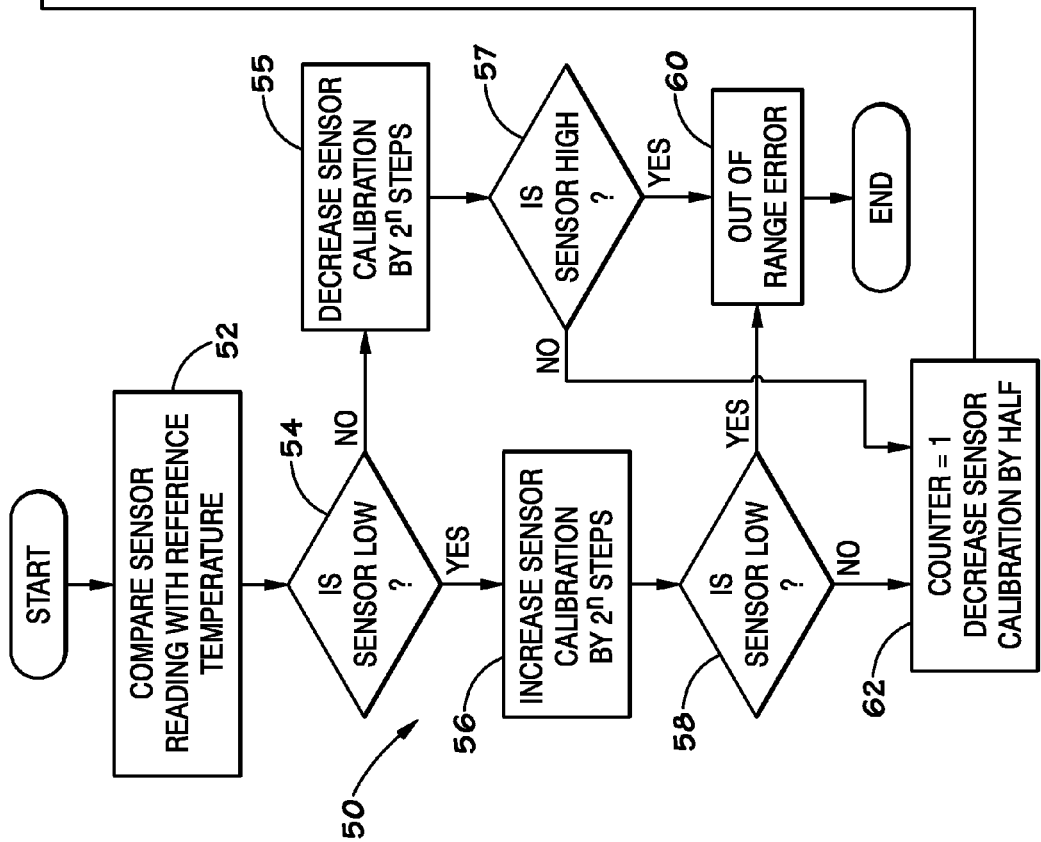
FIG. 3

SYSTEM AND METHOD FOR AUTOMATICALLY CALIBRATING A TEMPERATURE SENSOR

CROSS-REFERENCE TO RELATED APPLICATION

This application is a continuation of U.S. patent application Ser. No. 11/183,684, which was filed on Jul. 18, 2005, now U.S. Pat. No. 7,809,519, which issued on Oct. 5, 2010.

BACKGROUND OF THE INVENTION

1. Field of the Invention

The present invention relates generally to integrated circuits and, more particularly, to integrated circuits implementing temperature sensors.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As most people are aware, an integrated circuit is a highly miniaturized electronic circuit that is typically designed on a semiconductive substrate. Over the last 10 years, considerable attention has been paid to designing smaller, lower-power integrated circuits. These smaller, lower-power integrated circuits are often used in portable electronic devices that rely on battery power, such as cellular phones and laptop computers. As circuit designers research new ways to lower the power consumption of integrated circuits, they are constantly confronted with new challenges that need to be overcome in order to create the integrated circuits that will be part of the next generation of portable devices, such as computers, cellular phones, or cameras.

In many types of integrated circuits, it may be advantageous to accurately measure the temperature of the integrated circuit. One example of this type of integrated circuit is a dynamic random access memory ("DRAM") circuit. DRAM circuits store information in the form of a capacitive charge on a capacitor. If the charge on the capacitor is greater than a certain threshold, the capacitor may be deemed to store a one. Conversely, if the charge is less than a certain threshold, the capacitor may be deemed to store a zero. In this way, ones and zeros may be electronically stored on a grid of capacitors located within the DRAM. Unfortunately, these capacitors tend to lose their charges over time. As such, to accurately preserve the ones and zeros stored in the array of capacitors, it may be necessary to periodically refresh the capacitors with new charge, if needed. This periodic refreshing, however, can consume power or battery life. Temperature sensors may be advantageous in a DRAM because the speed at which the capacitors lose charge (i.e., how often the DRAM must be refreshed) is related to the temperature of the DRAM. Specifically, the capacitors within a DRAM tend to lose their charges more quickly when the temperature is higher than when the temperature is lower. By accurately measuring the temperature of the DRAM, it may be possible to alter the refresh rate of the DRAM to correspond to the temperature of the DRAM. This functionality can reduce the power usage of the DRAM.

Unfortunately, the process of fabricating a temperature sensor on the integrated circuit can introduce variation into the temperature sensor. For this reason, it may be advantageous to calibrate the temperature sensor. Traditionally, this calibration was performed manually. For example, a technician may place the temperature sensor into a temperature-controlled testing apparatus and then manually adjust the temperature sensor calibration until the temperature sensor is calibrated. While this method is effective, it is time consuming and may not be desirable for large scale production.

Embodiments of the present invention may address one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the invention provide a method and an apparatus for automatically calibrating a temperature sensor on an integrated circuit. Specifically, there is provided a system comprising a temperature sensor comprising a first resistance configured to indicate a temperature of the temperature sensor and a second resistance, in series with the first resistor, wherein the second resistance is adjustable to calibrate the first resistance, and a calibration circuit coupled to the temperature sensor and configured to automatically calibrate the first resistance.

BRIEF DESCRIPTION OF THE DRAWINGS

Advantages of the invention may become apparent upon reading the following detailed description and upon reference to the drawings in which:

FIG. 3 is a flowchart illustrating an exemplary bi-section technique for automatically calibrating a temperature sensor in accordance with embodiments of the present invention;

FIG. 6 is an exemplary calibration system configured to automatically determine an accurate calibration for a temperature sensor in accordance with embodiments of the present invention.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, there are numerous advantages to fabricating integrated circuits that include temperature sensors. With conventional temperature sensors, however, these benefits may be overshadowed by the inaccuracy or the inefficiency of conventional calibration techniques. Embodiments of the present invention define an accurate and efficient technique for automatically calibrating a temperature sensor on an integrated circuit.

Figure 1:
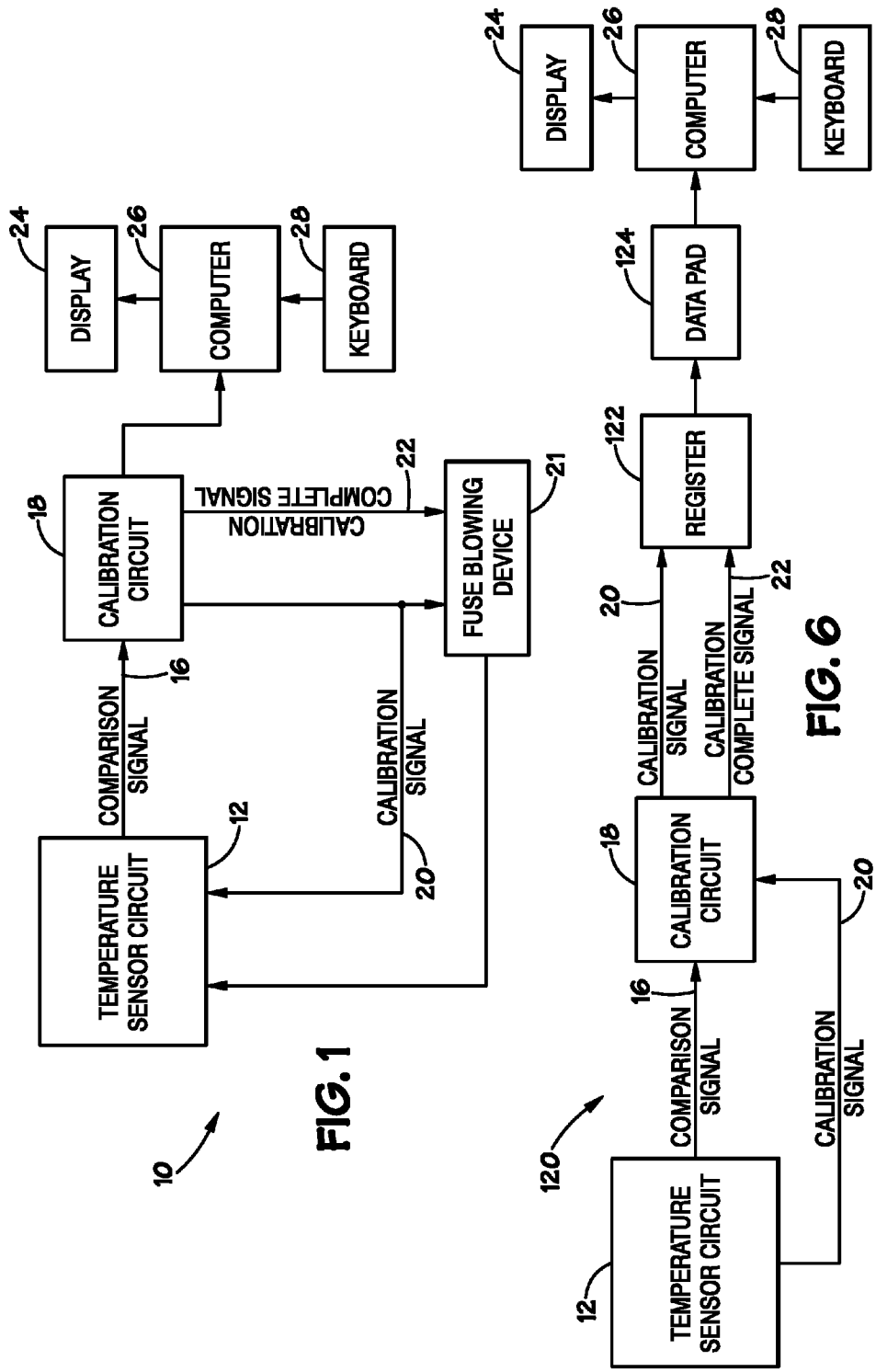
FIG. 1 illustrates an exemplary calibration system configured to automatically calibrate a temperature sensor in accordance with embodiments of the present invention.

Turning initially to FIG. 1, an exemplary calibration system configured to automatically calibrate a temperature sensor in accordance with embodiments of the present invention is illustrated and generally designated by a reference numeral 10. The calibration system 10 may comprise a temperature sensor circuit 12. In one embodiment, the temperature sensor circuit 12 is coupled to a calibration circuit 18. The temperature sensor circuit 12 may transmit a temperature comparison signal 16, which is indicative of calibration accuracy, to the calibration circuit 18. In the illustrated embodiment, the calibration circuit 18 is also coupled to a fuse blowing device 21, which can automatically blow fuses on temperature sensor circuit 12 to permanently set an accurate calibration into the temperature sensor circuit 12.

The calibration system 10 may also comprise a computer 26, which is coupled to the calibration circuit 18. In one embodiment, the computer 26 may be configured to control the calibration process and to receive any errors generated by the calibration circuit 18. In alternate embodiments, the computer 26 may be coupled to a fabrication automation system. Lastly, the computer 26 may also be coupled to a display 24 and a keyboard 28, which can provide user-interfaces to the computer 26.

Figure 2:
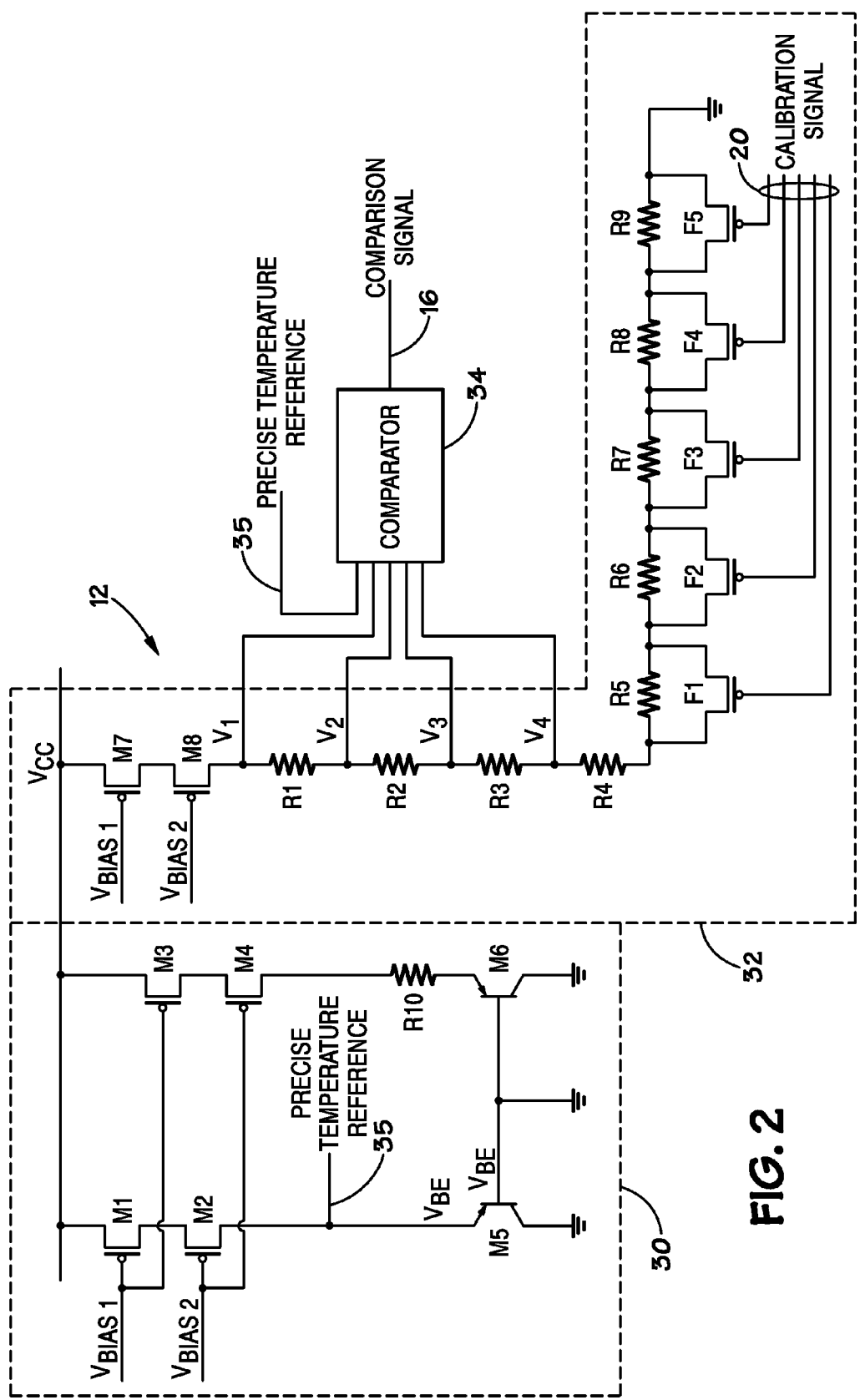
FIG. 2 illustrates an exemplary temperature sensor circuit in accordance with embodiments of the present invention.

FIG. 2 illustrates the exemplary temperature sensor circuit 12 in accordance with embodiments of the present invention. The temperature sensor circuit 12 may comprise a precision temperature detection circuit 30, a resistor stack temperature detection circuit 32, and a comparator 34. The precision temperature detection circuit 30 may generate a precise temperature reference. In one embodiment, the precision temperature detection circuit 30 comprises a PNP transistor M5 that is configured to generate a voltage $V_{BE}$ that is inversely proportional to a temperature. The voltage $V_{BE}$ is relatively precise and, as will be described below, can be used to calibrate the resistor stack temperature detection circuit 32. Those skilled in the art will appreciate that in alternate embodiments, a different component of the calibration system 10 may generate the precise temperature reference.

The precision temperature detection circuit 30 may also comprise transistors M1 and M2. The transistors M1 and M2 may be coupled to a supply voltage of the temperature sensor circuit Vcc and configured to provide voltage to the transistor M5. The transistors M1 and M2 may be coupled respectively to bias voltages Vbias1 and Vbias2. The supply voltage Vcc may also be coupled to transistors M3 and M4. As with the transistors M1 and M2, the transistors M3 and M4 may be biased by the bias voltages Vbias1 and Vbias2. The transistor M4 may be coupled to a resistor R10 and a transistor M6, which is coupled to the transistor M5. Vbias1 is an output of an operational amplifier (not shown) that maintains the drain voltages of M2 and M4 at the same potential. The transistors M1, M2, M3, M4, M5, and M6 and the resistor R10 generate a current Iptat that is proportional to the precise temperature reference.

As stated above, the resistor stack temperature detection circuit 32 (hereafter referred to as the resistor stack 32) may generate a series of voltages directly proportional to a temperature of the resistor stack 32. This type of resistor stack is well-known to those skilled in the art. Briefly stated, however, the resistor stack 32 may comprise one or more temperature detector resistors R1, R2, R3, and R4, one or more tuning resistors R5, R6, R7, R8, and R9, and one or more fuses F1, F2, F3, F4, and F5 that can be blown to either increase or decrease the total resistance in the circuit. In one embodiment, the fuses F1, F2, F3, F4, and F5 may comprise components, such as the "fuse transistors" illustrated in FIG. 2, that are configured to convert to a short circuit when they are "blown" by being exposed to a relatively high voltage. Specifically, in one embodiment, the fuses F1, F2, F3, F4, and F5 have two internal plates that can be fused together when connected to a relatively high voltage to create a short circuit. Those skilled in the art will appreciate that in alternate embodiments, the configuration of the resistor stack 32 may vary. For example, in one embodiment, the tuning resistors R5, R6, R7, R8, and R9 may be aligned in parallel with each other.

As described above, the voltages across each of the resistors R1, R2, R3, and R4 will vary based on the temperature of the temperature sensor circuit 12. The current Iptat is mirrored by the transistors M7 and M8. Because the current Iptat is proportional to the precise temperature reference, as the temperature increases, the current Iptat increases, which results in different voltage drops V1, V2, V3, and V4 across the resistors R1, R2, R3, and R4. In one embodiment, the values of each of resistors R1, R2, R3, and R4 are chosen to generate voltages V1, V2, V3, and V4 that each correspond to a particular temperature. For example, in one embodiment, the value of R1 is chosen to generate a voltage corresponding to zero degrees Celsius, the value of R2 is chosen to generate a voltage corresponding to 15 degrees Celsius, the value of R3 is chosen to generate a voltage corresponding to 40 degrees Celsius, and the value of R4 is chosen to generate a voltage corresponding to 70 degrees Celsius. Those skilled in the art will appreciate that by measuring the voltages V1, V2, V3, and V4, it is possible to calculate the temperature of the temperature sensor circuit 12.

As stated above, however, the exact values of the resistors R1, R2, R3, and R4 may be subject to process variations during production. For example, process variations may decrease the resistance of the resistors R1, R2, R3, and R4. This decrease in resistance can skew the voltages V1, V2, V3, and V4, which decrease the accuracy of the temperature measurement by the resistor stack 32. For this reason, as described above, the resistor stack 32 may comprise the tuning resistors R5, R6, R7, R8, and R9. By adding a specific amount of additional resistance in series with the resistors R1, R2, R3, and R4, the tuning resistors R5, R6, R7, R8, and R9 permit the voltage across each of the resistors R1, R2, R3, and R4 to be "tuned" to compensate for the process variations introduced during production.

In one embodiment, the total resistance across all of the tuning resistors R5, R6, R7, R8, and R9 is adjusted by selectively "adding" or "removing" tuning resistors R5, R6, R7, R8, and R9. Tuning resistors may be removed by short circuiting around a particular one of the tuning resistors R5, R6, R7, R8, and R9. Similarly, tuning resistors can be added by removing the short circuit from normally short-circuited resistors. For example, short circuiting around tuning resistor R6 would leave a total resistance equal to the sum of R5, R7, R8, and R9. In this way, it is possible to select amongst the tuning resistors R5, R6, R7, R8, and R9 to create a resistance that compensates for the process variation in the resistors R1, R2, R3, and R4. It will be appreciated that the five tuning resistors R5, R6, R7, R8, and R9 are exemplary. In alternate embodiments, a different number of tuning resistors may be employed. For example, in one embodiment explained more in regard to FIG. 3, the temperature sensor circuit 12 may include ten tuning resistor: five to tune the resistance up and five to tune the resistance down.

In one embodiment, there are two primary techniques for short circuiting around one of the tuning resistors R5, R6, R7, R8, and R9. As described above, the fuses F1, F2, F3, F4, and F5 may comprise transistors. For this reason, it is possible to short circuit around one of the resistors R5, R6, R7, R8, and R9 by applying a bias voltage to the fuse F1, F2, F3, F4, or F5 that corresponds to a particular resistor R5, R6, R7, R8, or R9. Applying this bias voltage will "turn on" a particular one of the fuses F1, F2, F3, F4, or F5 and short circuit around a particular one of the resistors R5, R6, R7, R8, and R9. Those skilled in the art, however, will appreciate that the technique is not permanent and will only short circuit around a particular resistor for as long as a bias voltage is applied. In this way, it is possible to test potential temperature sensor calibrations to determine an accurate temperature sensor calibration without permanently setting the "test" calibration.

Alternatively, as described above, a particular one of the fuses F1, F2, F3, F4, and F5 may be permanently "turned on" by fusing the two plates together within the fuses F1, F2, F3, F4, or F5 by "blowing" the fuse. Once a particular one of the fuses F1, F2, F3, F4, or F5 has been blown, the respective tuning resistor R5, R6, R7, R8, or R9 is permanently shorted out of the resistor stack 32. For this reason, it may be advantageous to avoid blowing the fuses F1, F2, F3, F4, and F5 until an accurate temperature sensor calibration has been determined.

The temperature sensor circuit 12 may also comprise a comparator 34 to compare the precise temperature reference voltage 35 with the voltage generated by the resistor stack 32. The results of this comparison may be transmitted to a calibration circuit 18 as a digital comparison signal 16. As will be described in greater detail below, in one embodiment, the comparison signal 16 may indicate whether the temperature measurement generated by the resistor stack 32 matches the precise temperature reference voltage 35 within a pre-determined margin of error (i.e., whether the voltage generated by the resistor stack is an accurate reflection of the actual temperature) or whether the temperature measurement generated by the resistor stack is higher or lower than the precise temperature reference. In one embodiment, the pre-determined margin of error is approximately one degree Celsius. In another embodiment, the pre-determined margin of error is approximately one degree Fahrenheit. If the temperature detected by the resistor stack 32 is either higher or lower than the precise temperature, the comparison signal 16 may indicate the degree of difference between the two voltages.

Returning again to FIG. 1, the temperature sensor circuit 12 may transmit the comparison signal 16 to the calibration circuit 18. As will be described in further detail below, the calibration circuit 18 may use the comparison signal 16 to calibrate the temperature sensor circuit 12. Specifically, the calibration circuit 18 may transmit a series of calibration signals 20 to the temperature sensor circuit 12, each of which comprises a proposed calibration for the temperature sensor circuit 12. In one embodiment, the calibration signal 20 comprises an n-bit long binary number that corresponds to the proposed calibration. This n-bit long number may correspond to the number of tuning resistors R5, R6, R7, R8, and R9 in the resistor stack 32. For example, a calibration signal of 00110 may be indicative of short circuiting around two of the resistors R6 and R7 from amongst the resistors R5, R6, R7, R8, and R9. Once the calibration circuit 18 determines the calibration signal 20 that causes the voltage generated by the each resistor in the resistor stack 32 to match the precision temperature reference voltage to within a predetermined margin of error (as described in regard to FIG. 3), the calibration circuit 18 may transmit the calibration signal 20 to an automatic fuse blowing device 21 along with a calibration complete signal 22. In one embodiment, the calibration complete signal 22 indicates to the automatic fuse blowing device 21 that the accurate temperature sensor calibration has been determined and that the temperature sensor circuit 12 can now be permanently calibrated to match the calibration signal 20. The fuse blowing device 21 may then blow the fuses F1, F2, F3, F4, and F5 within the resistor stack 32 to permanently set the calibration. In an alternate embodiment described in regard to FIG. 6, the accurate temperature sensor calibration is transmitted to a data pad 124 (FIG. 6) to permit the fuses F1, F2, F3, F4, and F5 (FIG. 2) to be manually blown by an operator.

Turning next to the operation of the calibration circuit 18, FIG. 3 is a flowchart illustrating an exemplary bi-section technique 50 for automatically calibrating a temperature sensor in accordance with embodiments of the present invention. The technique 50 may begin with the temperature sensor circuit 12 comparing its temperature indicative voltage from the resistor stack 32 with its precise temperature reference voltage, as indicated in block 52. If the temperature reading is lower than the precise temperature reference, the calibration circuit 12 may increase the sensor calibration by $2^n$ steps (block 56); whereas if the temperature reading is higher than the precise temperature reference, the calibration circuit 12 may decrease the sensor calibration by $2^n$ steps (block 55). In one embodiment, each step may correspond to one degree of temperature. For example, each step may correspond to one degree Celsius. Further, in one embodiment, n may be equal to five, and the calibration circuit is configured to calibrate the temperature sensor circuit to within one degree Celsius over a range of plus or minus 32 degrees (i.e., $2^5$) within five iterations or steps. In alternate embodiments, n may be another suitable value depending on the desired accuracy and the desired number of iterations (see below).

If the initial temperature reading was low (block 56), the calibration circuit 18 may determine whether the temperature reading from the resistor stack 32 (after the increase of $2^n$ steps) is still lower than the precise temperature reference, as indicated in block 58. If the temperature reading is lower, it may indicate that the temperature sensor calibration is out of tuning range of the temperature calibration circuit 18 (block 60), and the technique 50 may end. Similarly, if the initial temperature reading was high (block 55), the calibration circuit 18 may determine whether the temperature reading from the resistor stack 32 (after the decrease of $2^n$ steps) is still higher than the precise temperature reference, as indicated in block 58. If the temperature reading is higher, it may indicate that the temperature sensor calibration is out of tuning range of the temperature calibration circuit 18 (block 60), and the technique 50 may end. In the illustrated embodiment, the technique 50 may generate an error to indicate that the temperature sensor is out of the calibration range, as indicated by block 60 and then the technique 50 may end. In alternate embodiments, the technique 50 may proceed to block 72 after generating the out of range error, because an increase of $2^n$ steps will get the temperature reading of the resistor stack 32 as close to the precise temperature reference as tuning resistors, such as the tuning resistors R5-R9, will permit.

If the sensor calibration was not too high or too low, the calibration circuit 18 may initialize a counter to a value of one and may decrease the sensor calibration by half of the previous increase (i.e., a decrease of $2^4$ or 16 steps), as indicated in block 62. Next, the calibration circuit 18 may once again determine whether the temperature sensor is lower than the precise temperature reference, as indicated in block 64. If the temperature sensor is high, the calibration will increment the internal counter and decrease the sensor calibration by half the steps of the previous increase or decrease, as indicated by block 66. If, on the other hand, the temperature sensor is low, the calibration will increment the internal counter and increase the sensor calibration by half the steps of the previous increase or decrease, as indicated by block 68.

Next, as illustrated by block 70, the technique will loop back to block 64 and repeat blocks 64 through 68 until the calibration circuit's internal counter is greater than n+1. For example, if n equals five, the technique 50 will loop through blocks 64 to 68 four additional times until the internal counter equals six. After the internal counter is greater than n+1, the calibration circuit 18 may transmit a calibration complete signal, as indicated in block 72. In one embodiment, the calibration complete signal 22 may initiate an automatic process to blow (block 74) some or all of fuses, fuses F1, F2, F3, F4, and F5 for example, in the temperature calibration circuit 18, as will be described in regard to FIG. 5. In alternate embodiments, such as the embodiment shown in FIG. 6, the calibration complete signal 22 may be transmitted to the computer 26 to indicate to an operator that an accurate calibration has been determined. Lastly, if appropriate for the embodiment, some or all of the tuning fuses within the temperature reference circuit may be blown to permanently set the calibration.

Those skilled in the art will appreciate that the technique 50 uses a bi-section methodology to efficiently arrive at the accurate calibration. Those skilled in the art, however, will also appreciate that technique 50 is merely one example of a methodology for automatically calibrating the temperature circuit 12. In alternate embodiments, different incremental/decremental methodologies may be employed. For example, in one embodiment, the temperature sensor circuit 12 may be calibrated by adding one step to its sensor calibration, checking the accuracy of that calibration setting, and repeating, if necessary, until an accurate sensor calibration is determined.

Figure 4:
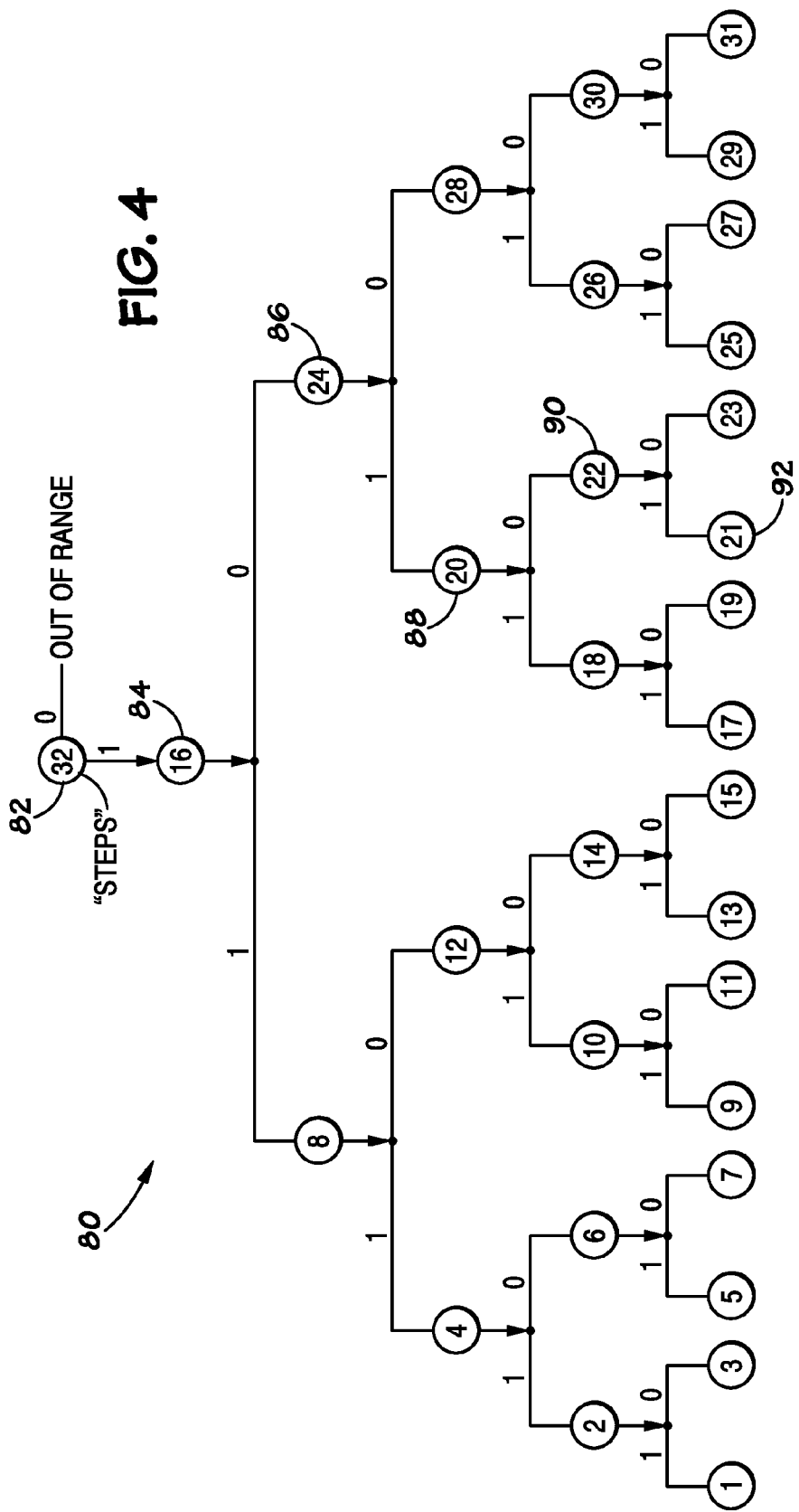
FIG. 4 illustrates an exemplary state diagram for a state machine configured to automatically calibrate a temperature circuit using the exemplary bi-section technique in accordance with embodiments of the present invention.

The technique 50 may be implemented in hardware, firmware, software, or a combination of hardware, firmware, and software. In one embodiment, the technique 50 may be implemented by a state machine. For example, FIG. 4 is an exemplary state diagram for a state machine 80 configured to automatically calibrate the temperature sensor circuit 12 using the exemplary bi-section technique in accordance with embodiments of the present invention. As illustrated by the state machine 80, the technique 50 may be employed to determine a calibration within 1 step (e.g. 1 degree) in five comparisons. For example, if the accurate calibration requires an increase of 21 steps (circle 92), the state machine 80 may first add 32 steps (circle 82), then subtract 16 steps (circle 84), then add 8 steps (circle 86), then subtract 4 steps (circle 88), then add 2 steps (circle 90), and lastly subtract 1 step (circle 92) to arrive at the 21 step adjustment.

Figure 5:
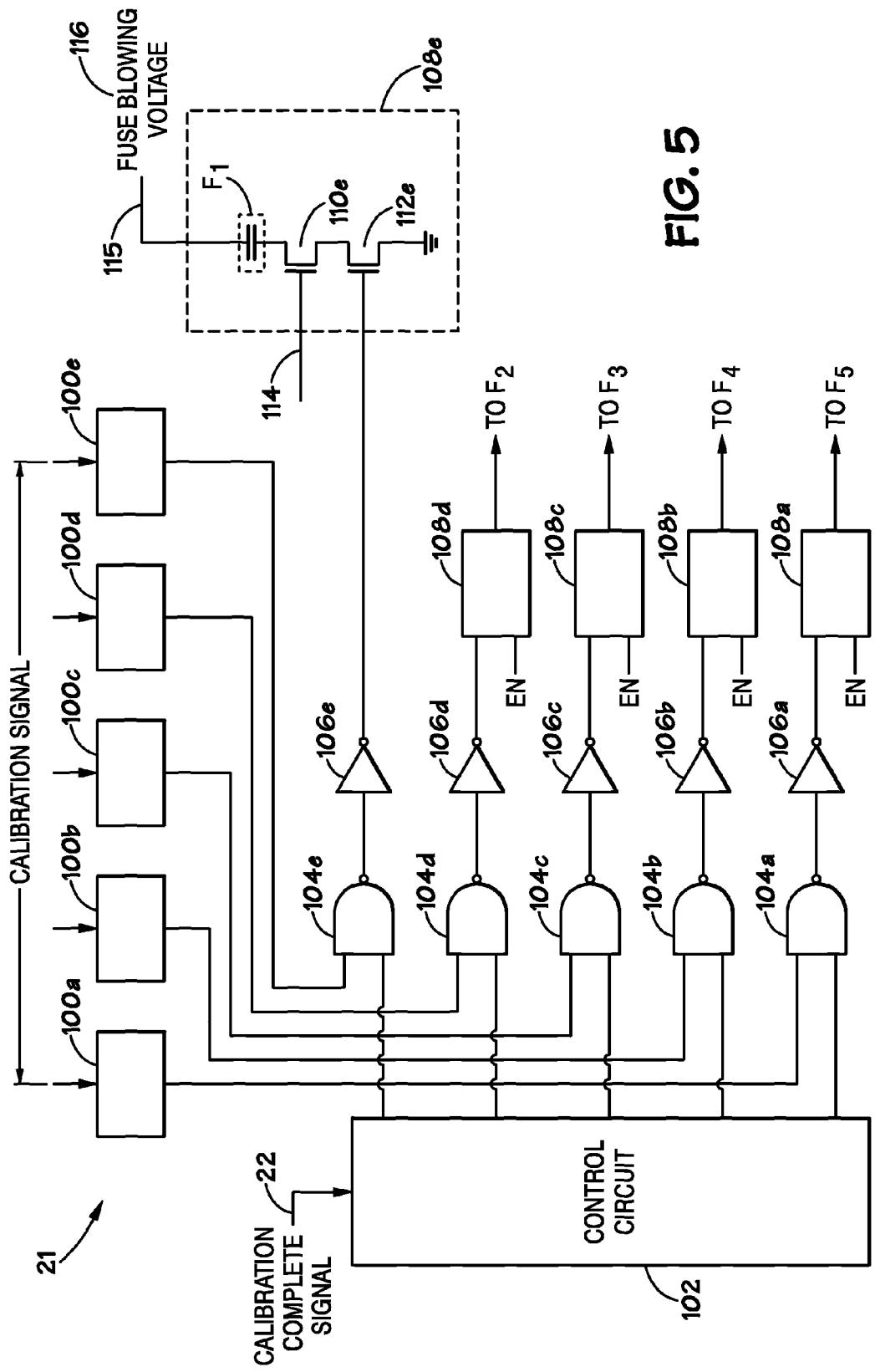
FIG. 5 illustrates an exemplary automatic fuse blowing device in accordance with embodiments of the present invention.

FIG. 5 illustrates the exemplary automatic fuse blowing device 21 in accordance with embodiments of the present invention. In one embodiment, the automatic fuse blowing device 21 comprises a plurality of latches 100a, 100b, 100c, 100d, and 100e, a control circuit 102, a plurality of NAND gates 104a, 104b, 104c, 104d, and 104e, a plurality of inverters 106a, 106b, 106c, 106d, and 106e, and a plurality of fuse blowing circuits 108a, 108b, 108c, 108d, and 108e. Each of the fuse blowing circuits 108a, 108b, 108c, 108d, and 108e may comprise an enabling signal transistor 110a, 110b, 110c, 110d, and 110e (only 110e is shown in FIG. 5) and a grounding transistor 112a, 112b, 112c, 112d, and 112e (only 112e is shown in FIG. 5). The trim signal transistor 110e may be coupled to a wire 114 that receives the calibration complete signal 22 from the calibration circuit 18, a wire 115 that carries voltage sufficient to blow the fuses F1, F2, F3, F4, and F5, and the fuses F1, F2, F3, F4, and F5 themselves. While the automatic fuse blowing device 21 is depicted in FIGS. 1, 2, and 5 as being separate from the temperature sensor circuit 12, those skilled in the art will appreciate that in alternate embodiments, the automatic fuse blowing device 21 may be integrated into the temperature sensor circuit 12.

Turning next to the operation of the automatic fuse blowing device 21, as stated above, the calibration signal 20 may be an n-bit long number, wherein each individual bit corresponds to one of the tuning resistors R5, R6, R7, R8, and R9. Each individual bit may be transmitted to a one-bit latch, such as the latches 100a, 100b, 100c, 100d, and 100e. For instance, in the example describe above where the calibration signal 20 comprises the five bit binary number 00110, the numbers 0, 0, 1, 1, and 0 may each be transmitted into the latches 100a, 100b, 100c, 100d, and 100e respectively.

Next, the control circuit 102 may determine which of the fuses F1, F2, F3, F4, and F5 should be blown to calibrate the temperature sensor circuit 12. In one embodiment, this determination is based on the calibration signal 20. Because a relatively high voltage is needed to blow each of the fuses F1, F2, F3, F4, and F5, the control circuit 12 may be configured to blow the fuses F1, F2, F3, F4, and F5, one at a time. For example, the automatic fuse blowing device 21 may first determine whether the fuse F1 should be blown. If the fuse F1 should be blown, the automatic fuse blowing device 21 would then blow the fuse F1. The automatic fuse blowing device 21 may then determine whether the fuse F2 should be blown and so on with the remaining fuses F3, F4, and F5. In one embodiment, the control circuit 12 may maintain this order by transmitting an enabling signal to one of the NAND gates 104a, 104b, 104c, 104d, and 104e at a time. Those skilled in the art will appreciate that in alternate embodiments this methodology for blowing the fuses may differ.

After receiving the calibration complete signal, the control circuit 102 may first enable the NAND gate 104e by transmitting a logical "one" to the NAND gate 104e. If the latch 100e, which is coupled to the NAND gate 104e, contains a "one," then transmitting a one to the NAND gate 104e will result in the NAND gate generating a logical "zero." If, on the other hand, the latch 100e contains a "zero," the NAND gate 104e will produce a "one," which will in turn be converted into a zero by the inverter 106e. Those skilled in the will appreciate that the latches 100a, 100b, 100c, 100d, and 100e, the NAND gates 104a, 104b, 104c, 104d, and 104e, and the inverters 106a, 106b, 106c, 106d, and 106e are merely one embodiment of logic capable of transmitting a "one" to the fuse blowing circuit 108e if a particular bit of the n-bit long number indicates that a particular fuse should be blown and that particular bit is enabled by the control circuit 102. In alternate embodiments, different logical schemes may be employed.

If the output from the inverter 106e is a "one," those skilled in the art will appreciate that the voltage of this digital "one" will "open" the grounding transistor 112e. Next, as described above, if the calibration sensor 18 has determined an accurate calibration for the temperature sensor circuit 12, a calibration complete signal 22 will be transmitted to the automatic fuse blowing device over the wire 114. This calibration complete signal will "open" the trim signal transistor 110e. With both the trim signal transistor 110e and the grounding transistor 112e open to the flow of current though the wire 115, the relatively high voltage on the wire 115 will ionize the air between the plates of the fuse F1 and current will arc across the plates. Because the relatively high voltage on the wire 115 is configured to be sufficiently high to "blow" fuses, the arcing current will fuse the plates together and permanently create a short circuit across the fuse F1. The process described above will continue in the manner described above with the control circuit 112 sequentially enabling each of the NAND gates 104a, 104b, 104c, and 104d. In this way, the automatic fuse blowing device 21 is able to automatically "program" the temperature sensor circuit 12 with the accurate temperature calibration.

FIG. 6 is an exemplary calibration system 120 configured to automatically determine an accurate calibration for a temperature sensor in accordance with embodiments of the present invention. For simplicity, like reference numerals have been used to designate features previously described in relationship to FIGS. 1-5. The calibration system 10 functions similarly to the calibration system 120 described in regard to FIGS. 1-5. Unlike the calibration system 10, however, the calibration system 120 is not configured to automatically blow the fuses F1, F2, F3, F4, and F5 once an accurate calibration has been determine. Specifically, once the calibration circuit 18 determines the accurate calibration for the temperature sensor circuit 12, the calibration circuit 18 may transmit that calibration signal 20 and a calibration complete signal 22 to a register 122. The register 122 may then transmit the calibration signal 20 (i.e., the accurate calibration settings) to a data pad 124. The accurate calibration settings can then be downloaded from the data pad 124 by the computer 26. In one embodiment, once downloaded, the accurate calibration settings can be used to manually blow the appropriate fuses on the temperature sensor circuit 12 with a manually operated fuse blowing device (not shown).

Figure 7:
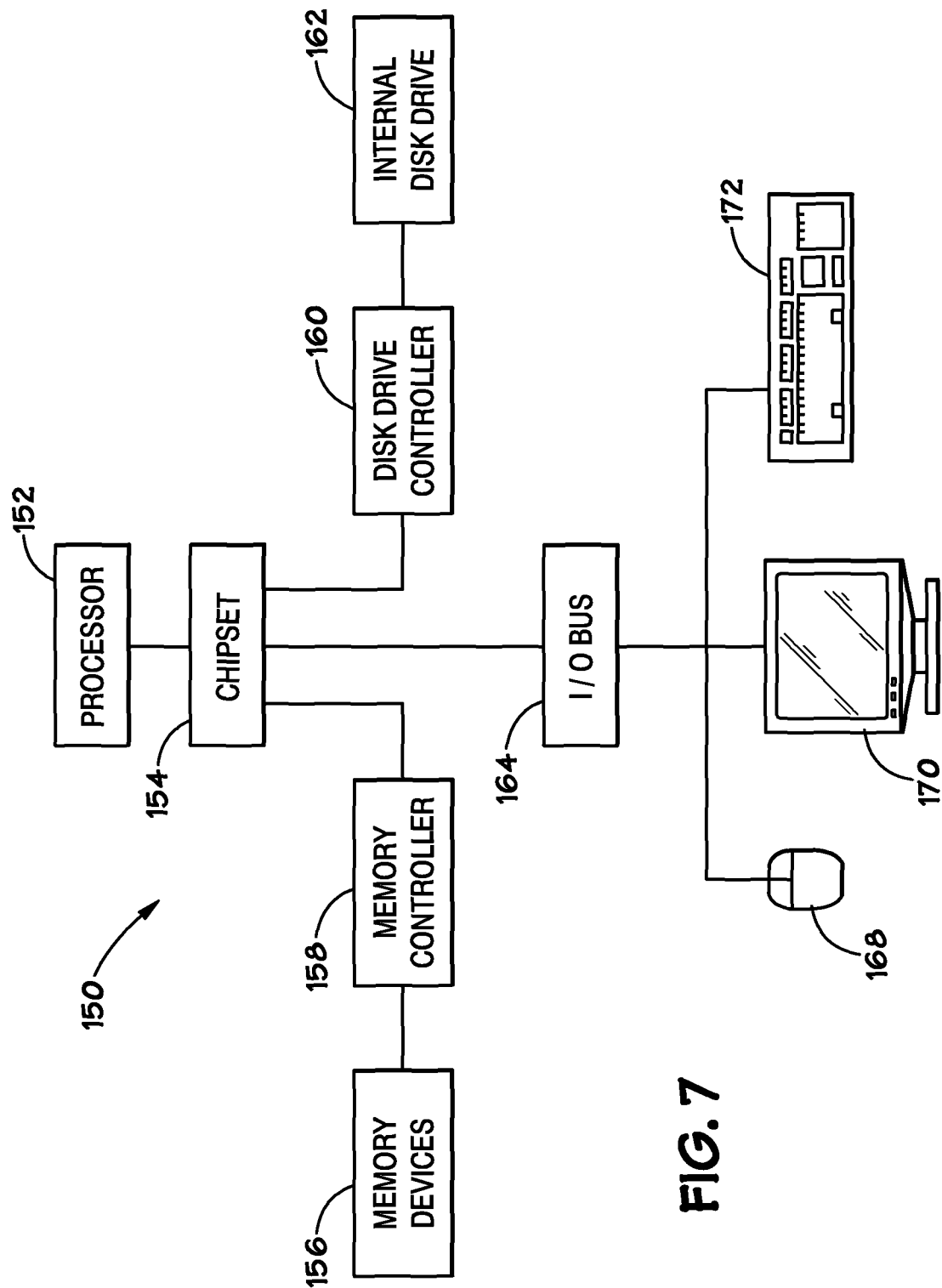
FIG. 7 illustrates an exemplary system employing an exemplary temperature sensor that may be automatically calibrated in accordance with embodiments of the invention is illustrated

The method and system for automated calibration of a temperature sensor discussed above is particularly useful in the production of memory devices and processors. For example, referring to FIG. 7, a block diagram of an exemplary system employing a temperature sensor that may be automatically calibrated in accordance with embodiments of the invention is illustrated and generally designated by a reference numeral 150. The system 150 may include one or more processors or central processing units ("CPUs") 152. The CPU 152 may be used individually or in combination with other CPUs. While the CPU 152 will be referred to primarily in the singular, it will be understood by those skilled in the art that a system with any number of physical or logical CPUs may be implemented. Examples of suitable CPUs include the Intel Pentium 4 processor and the AMD Athlon processor. In one embodiment of the invention, a temperature sensor on the CPU 152 may be calibrated by the automated calibration method described with reference to FIG. 3.

A chipset 154 may be operably coupled to the CPU 152. The chipset 154 is a communication pathway for signals between the CPU 152 and other components of the system 150, which may include a memory controller 158, an input/output ("I/O") bus 164, and a disk drive controller 160. Depending on the configuration of the system, any one of a number of different signals may be transmitted through the chipset 154, and those skilled in the art will appreciate that the routing of the signals throughout the system 150 can be readily adjusted without changing the underlying nature of the system.

As stated above, the memory controller 158 may be operably coupled to the chipset 154. In alternate embodiments, the memory controller 158 may be integrated into the chipset 154. The memory controller 158 may be operably coupled to one or more memory devices 156. In one embodiment of the invention, the memory devices 156 may comprise a temperature sensor configured to be calibrated by the automated calibration method described in reference to FIG. 2. The memory devices 156 may be any one of a number of industry standard memory types, including but not limited to, single inline memory modules ("SIMMs") and dual inline memory modules ("DIMMs").

The chipset 154 may also be coupled to the I/O bus 164. The I/O bus 164 may serve as a communication pathway for signals from the chipset 154 to I/O devices 168-172. The I/O devices 168-172 may include a mouse 168, a video display 170, or a keyboard 172. The I/O bus 164 may employ any one of a number of communications protocols to communicate with the I/O devices 168-172. In alternate embodiments, the I/O bus 164 may be integrated into the chipset 154.

The disk drive controller 160 may also be operably coupled to the chipset 154. The disk drive controller 160 may serve as the communication pathway between the chipset 154 and one or more internal disk drives 162. The disk drive controller 160 and the internal disk drives 162 may communicate with each other or with the chipset 154 using virtually any type of communication protocol, including all of those mentioned above with regard to the I/O bus 164.

It is important to note that the system 150 described above in relation to FIG. 7 is merely one example of a system employing circuits comprising temperature sensors that were calibrated by automated calibration. In alternate embodiments, such as cellular phones or digital cameras, the components may differ from the embodiment shown in FIG. 7.

Many of the steps of the exemplary process described above may comprise an ordered listing of executable instructions for implementing logical functions. The ordered listing can be embodied in any computer-readable medium for use by or in connection with a computer-based system that can retrieve the instructions and execute them to carry out the previously described processes of automatically calibrating a temperature sensor. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system comprising:
a temperature sensor circuit comprising:
   a precision temperature detection circuit configured to generate a voltage indicative of a temperature of the system; and
   a resistor stack temperature detection circuit configured to detect a temperature of the system, wherein the resistor stack comprises:
      a first plurality of resistors arranged in series;
      a second plurality of resistors arranged in series, and arranged in series with the first plurality of resistors; and
      a plurality of fuse transistors configured to create a short across one or more of the second plurality of resistors if activated; and
   a comparator configured to compare the voltage from the precision temperature detection circuit with one or more voltages measured across resistors of the resistor stack temperature detection circuit and generate a comparison signal; and
a calibration circuit configured to calibrate the temperature sensor circuit using the comparison signal.

2. The system, as set forth in claim 1, wherein the calibration circuit is configured to generate one or more calibration signals to the temperature sensor circuit indicative of a proposed calibration of the temperature sensor circuit, based at least in part on the comparison signal.

3. The system, as set forth in claim 1, wherein each of the plurality of fuse transistors is arranged in parallel with a respective one of the second plurality of resistors.

4. The system, as set forth in claim 1, comprising a fuse blowing device configured to activate one or more of the plurality of fuse transistors to create a short across the one or more of the second plurality of resistors.

5. The system, as set forth in claim 4, wherein the calibration circuit is configured to generate one or more calibration signals to fuse blowing device indicative of which of the fuse transistors should be blown to create a short across the one or more of the second plurality of resistors.

6. The system, as set forth in claim 1, wherein the comparator is configured to compare using a bi-section technique.

7. A method comprising:
generating a reference voltage using a first detection circuit of a temperature sensor circuit;
generating a plurality of resistor voltages across a first portion of a series of resistors using a second detection circuit of the temperature sensor circuit;
comparing the reference voltage to the plurality of resistor voltages;
generating a comparison signal using a comparator; and
removing resistance from the series of resistors based on the comparison signal.

8. The method, as set forth in claim 7, wherein generating the plurality of resistor voltages comprises generating a plurality of resistor voltages, wherein each of the plurality of resistor voltages in indicative of a temperature.

9. The method, as set forth in claim 7, wherein removing the resistance comprises shorting one or more of a second portion of the series of resistors.

10. The method, as set forth in claim 9, wherein shorting comprises blowing one or more fuses, wherein each of the one or more fuses is arranged in parallel with a respective one of the second portion of the series of resistors.

11. The method, as set forth in claim 10, comprising receiving a calibration signal at each of the one or more fuses, wherein the calibration signal indicates which of the one or more fuses should be blown to calibrate the first portion of the series of resistors.

12. The method, as set forth in claim 10, comprising receiving a calibration signal at a data pad, wherein the calibration signal indicates how much resistance should be removed from the series of resistors in order to calibrate the temperature sensor circuit.

* * * * *